United States Patent

Maley et al.

[15] 3,671,764

[45] June 20, 1972

[54] AUTO-RESET TERNARY LATCH

[72] Inventors: Gerald A. Maley, Fishkill; James L. Walsh, Hyde Park, both of N.Y.

[73] Assignee: International Business Machines Corporation, Armonk, N.Y.

[22] Filed: Feb. 5, 1971

[21] Appl. No.: 112,983

[52] U.S. Cl.................................307/209, 307/289, 328/205
[51] Int. Cl........................................H03k 19/00, H03k 3/14
[58] Field of Search...........................307/209, 289; 328/205

[56] References Cited

UNITED STATES PATENTS 3,538,349 11/1970 Smith................................307/286 X

*Primary Examiner*—John Zazworsky
*Attorney*—Hanifin & Jancin and Martin G. Reiffin

[57] ABSTRACT

An auto-reset ternary latch has a data input line, a gate line and an output line. Each of said lines is adapted to assume any one of three potential levels. When the potential of the gate is lowered from the uppermost level to an intermediate level, the potential of the output line moves up or down one level to an intermediate value. When the potential of the gate is lowered all the way to the lowermost level, the potential of the output line matches that of the data input line. The potential of the output line is maintained at said value when the potential of the gate line is thereafter raised.

13 Claims, 3 Drawing Figures

| INPUT | OUTPUT |
|---|---|
| 0 | 2 |
| 1 | 1 |
| 2 | 0 |

| INPUTS A | INPUTS B | OUTPUT |
|---|---|---|
| 0 | 0 | 0 |
| 0 | 1 | 1 |
| 0 | 2 | 2 |
| 1 | 0 | 1 |
| 1 | 1 | 1 |
| 1 | 2 | 2 |
| 2 | 0 | 2 |
| 2 | 1 | 2 |
| 2 | 2 | 2 |

INVENTORS
GERALD A. MALEY
JAMES L. WALSH
BY Martin G. Reiffin
ATTORNEY

AUTO-RESET TERNARY LATCH

BACKGROUND OF THE INVENTION

1. Field of the Invention

The present invention relates to ternary algebra; that is, to an algebra wherein the variables may take on any one of three values, as distinguished from merely the two values of Boolean or binary algebra. The invention also relates to so-called "auto-reset" or "polarity-hold" latches; that is, to latches which after being set do not have to be reset before being set again. This type of latch is a basic building block for shift registers, rings and counters.

2. Description of the Prior Art

Auto-reset latches are well known in the binary art. However, the present inventors know of no auto-reset latch in the prior art of the ternary system.

Binary auto-reset latches of the prior art operate in the following manner. Normally, the gate line is at its upper potential level and the latch is insensitive to all signal changes on the data line. If the gate potential is lowered, the latch output will match the value of the data line and will remain latched in this state when the gate line potential is returned to its upper value. The latch is called "auto-reset" because it need not be reset before setting it to a new value.

SUMMARY OF THE INVENTION

It is, therefore, a primary object of the present invention to provide an auto-reset or polarity-hold latch which operates in the ternary or three-valued system. The data input line, the gate line and the output line can assume any one of three potential levels. The potential of the output line moves up or down one level when the potential of the gate line is lowered to an intermediate level, and the output line matches that of the data input line when the gate potential goes to the lowermost level.

DESCRIPTION OF THE PREFERRED EMBODIMENT

Figure 1:
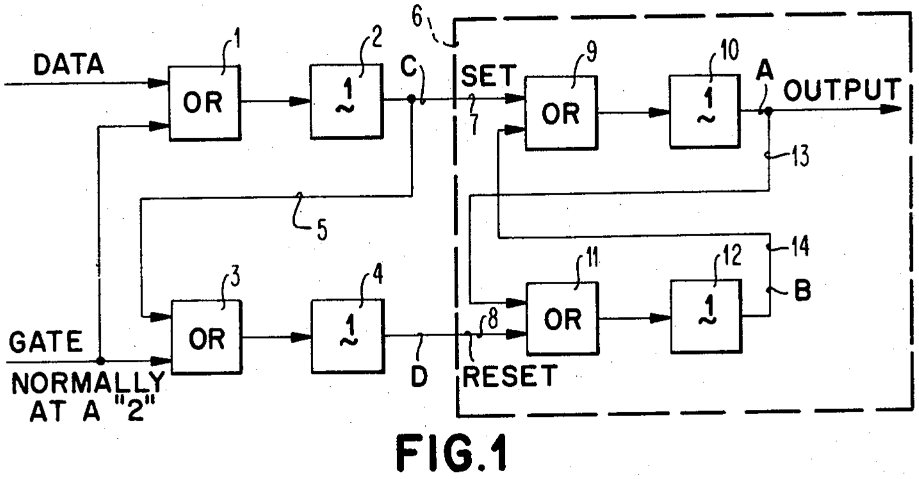
FIG. 1 is a schematic diagram showing a ternary latch in accordance with the present invention.
Figure 2:
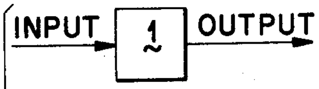
FIG. 2 shows the symbol and truth table for the Interchanger 1 circuit.
Figure 3:
FIG. 3 shows the symbol and truth table for the OR function.

Referring now to the drawing in more detail, the reference numeral 1 designates an OR gate 1 having two input lines: a data input line, and a gate input line. The output of OR gate 1 is fed to the input of an Interchanger circuit 2, designated by the symbol ⊥. Another OR gate 3 is provided with two inputs: a first input extending from the gate line and a second input provided from the output of Interchanger 1 circuit 2 and designated by reference numeral 5. The output of OR gate 3 goes to the input of an Interchanger 1 circuit 4.

Within the dashed lines 6, there is shown a ternary latch circuit described in more detail in our copending application, Ser. No. 113,001, filed Feb. 5, 1971, now U.S. Pat. No. 3,641,728 and entitled, Three State Latch. The set line of the latch 6 is indicated by the reference numeral 7 and extends to one of the inputs of the OR gate 9 having its output fed to the input of an Interchanger 1 circuit 10. The reset line 8 of the latch circuit 6 extends to one of the inputs of the lower OR gate 11 having its output fed to the input of an Interchanger 1 circuit 12. Extending from the output line is a lead 13 going to the other input of the OR gate 11. Extending from the output of Interchanger 1 circuit 12 is a lead 14 going to the other input line of OR gate 9.

The ternary OR gates 1, 3, 9, 11 may have the same circuitry as conventional binary OR gates well known in the prior art. The Interchanger 1 gates 2, 4, 10, 12 may be constructed in accordance with the circuitry of either of the embodiments in our co-pending application Ser. No. 113,000, filed Feb. 5, 1971 and entitled "Interchanger 1 Circuits," or may be constructed in accordance with the circuitry of U.S. Pat. No. 3,156,830.

Normally the gate line is at a "2" level and the latch is insensitive to all changes on the data line. However, if the gate line is lowered to a "0," the latch will operate to match the value of the data input and will remain latched in this state as the gate lines return to "2." The latch need not be reset before setting it to a new value. When the gate line is lowered only half way to a "1," the latch output will move up or down only one level to an intermediate value of "1."

The following table shows what level the set, reset and input lines must be at to move the latch to any one of its three possible states:

| Output A | Set C | Reset D | B |
|---|---|---|---|
| 0 | 2 | 0 | 2 |
| 1 | 1 | 1 | 1 |
| 2 | 0 | 2 | 0 |

As stated above, the GATE is normally at the value "2" and maintains lines C and D both at "0." But now if the "GATE" is lowered to a "0," then line D will move to the value of the DATA line and line C will take on the value of C operated on by the Interchanger 1.

While there are many series of input changes that are of interest, there are but nine of immediate interest. These nine occur when the latch is set in any one of its latched states; output at 0, 1 or 2, and then driven to any one of the three possible values of the DATA. A trace of two of these series is shown below.

EXAMPLE I

Start Condition

Latch set at a 0

DATA line a 2

GATE line set to isolate the latch; gate line at 2.

Operation

When gate line is lowered to a 0, the latch should be driven to the value of the DATA (2).

Sequence of Events

| | Gate Line | Data Line | Line D | Line C | Line B | Line A OUTPUT |
|---|---|---|---|---|---|---|
| Start | 2 | 2 | 0 | 0 | 2 | 0 |
| Gate goes | 0 | 2 | 2 | 0 | 2 | 0 |
| down | 0 | 2 | 2 | 0 | 0 | 0 |
| Network stable | 0 | 2 | 2 | 0 | 0 | 2 |
| Gate goes up and network is stable | 2 | 2 | 0 | 0 | 0 | 2 |

EXAMPLE II:

Start Condition

Latch set at a 2

DATA line at a 0

DATA LINE AT A )

GATE line at 2

Operation

When gate line is lowered to a 0, the latch should be driven to the value of the DATA line (0).

Sequence of Events

| | gate line | data line | line D | line C | line B | line A |
|---|---|---|---|---|---|---|
| Start | 2 | 0 | 0 | 0 | 0 | 2 |
| GATE goes down | 0 | 0 | 2 | 2 | 0 | 2 |
| | | | same time | | | |
| | 0 | 0 | 0 | 2 | 0 | 0 |
| Stable | 0 | 0 | 0 | 2 | 2 | 0 |
| GATE goes up and network is stable | 2 | 0 | 0 | 0 | 2 | 0 |

It is to be understood that the specific embodiment disclosed herein is merely illustrative of one of the many forms which this invention may take in practice and that numerous modifications thereof will readily occur to those skilled in the art without departing from the scope of the invention as delineated in the appended claims, and that the claims are to be construed as broadly as permitted by the prior art.

We claim:

1. An auto-reset ternary latch comprising
   a data input line having applied thereto electrical signals at any one of three potential levels,
   a gate input line having applied thereto electrical signals at any one of three potential levels,
   an output line having applied thereto electrical signals at any one of three potential levels,
   means connecting said lines for causing the potential of the output to assume and maintain a set value in response to maintenance of the potential of the gate line at an intermediate level, and for causing the potential of the output line to match and maintain any of the three potential levels of the data input line in response to lowering of the potential of the gate line to the lowermost level.

2. An auto-reset ternary latch as recited in claim 1 and comprising
   means for maintaining the potential of the output line at its set or matching value when the potential of the gate line is thereafter raised.

3. An auto-reset ternary latch comprising
   a gate line,
   an output line,
   each of said lines having applied thereto electrical signals at any one of three potential levels, and
   means connecting said lines for causing the potential of the output line to move up or down one level to an intermediate level and for maintaining the output line potential at said intermediate level in response to lowering of the potential of the gate line from an uppermost level to an intermediate level.

4. An auto-reset ternary latch as recited in claim 3 wherein said means comprises:
   means connecting said lines for maintaining the potential of the output line at its intermediate level as the potential of the gate line is thereafter raised.

5. An auto-reset ternary latch as recited in claim 4 and comprising:
   a data input line,
   said means further comprising means connecting said data input line for causing the potential of the output line to assume and maintain any of the three potential levels of the data input line in response to lowering of the gate line to the lowermost level.

6. A ternary latch circuit comprising
   a data input line having applied thereto electrical signals at any one of three potential levels,
   a gate input line having applied thereto electrical signals at any one of three potential levels,
   an output line having applied thereto electrical signals at any one of three potential levels, and
   means connecting said lines and responsive to the attainment by the gate input line of a predetermined potential level for causing the potential of the output line to vary correspondingly with the potential of the data input line as the potential of the data input line goes to any of said first-recited three potential levels.

7. A ternary latch circuit as set forth in claim 6 wherein
   said means is responsive to the lowering of the potential of the gate input line to the lowermost of said second-recited three potential levels.

8. A ternary latch circuit comprising
   a first pair of ternary OR gates each having two inputs and one output,
   a first pair of ternary Interchanger 1 gates each having an input and an output,
   means connecting the output of each Interchanger 1 gate to an input of a respective one of said OR gates,
   means connecting the output of each OR gate to the input of a respective one of said Interchanger 1 gates,
   a second pair of ternary OR gates each having two inputs and one output,
   a second pair of ternary Interchanger 1 gates each having an input and an output,
   means connecting the output of each of said second pair of Interchanger 1 gates to the other input of a respective one of said first pair of OR gates,
   means connecting the output of one of said second pair of Interchanger 1 gates to an input of one of said second pair of OR gates,
   means connecting the output of the other of said second pair of OR gates to the input of said one of said second pair of Interchanger 1 gates, and
   means connecting the output of said one of said second pair of OR gates to the input of the other of said second pair of Interchanger 1 gates.

9. A ternary latch circuit as set forth in claim 8 and comprising
   means for transmitting a data signal to one input of said other of said second pair of OR gates, and
   means for transmitting a gate signal to the other inputs of each of said second pair of OR gates.

10. An auto-reset ternary latch comprising
   a data input line having applied thereto electrical signals at any one of three potential levels,
   a gate input line having applied thereto electrical signals at any one of three potential levels,
   an output line having applied thereto electrical signals at any one of three potential levels,
   means connecting said lines for causing the potential of the output line to assume and maintain a set value in response to maintenance of the potential of the gate line at a first predetermined level, and for causing the potential of the output line to match and maintain any of the three potential levels of the data input line in response to a transition of the potential of the gate line to a second predetermined level.

11. An auto-reset ternary latch as recited in claim 10 wherein said means comprises
   means for maintaining the potential of the output line at its set or matching level when the potential of the gate line is thereafter raised.

12. A ternary latch circuit comprising
   a data input line having applied thereto electrical signals at any one of three potential levels,
   a gate input line having applied thereto electrical signals at any one of said three potential levels,
   an output line having applied thereto electrical signals at any one of said three potential levels, and
   means connecting said lines and responsive to the attainment by the gate input line of a predetermined potential level for causing the potential of the output line to assume and maintain the potential of the data input line as the potential of the data input line goes to any of said three potential levels.

13. A ternary latch circuit as set forth in claim 12 wherein
   said means is responsive to the lowering of the potential of the gate input line to the lowermost of said three potential levels.

* * * * *

PO-1050
(5/69)

UNITED STATES PATENT OFFICE
CERTIFICATE OF CORRECTION

Patent No. 3,671,764 Dated June 20, 1972

Inventor(s) G. A. Maley, J. L. Walsh

It is certified that error appears in the above-identified patent and that said Letters Patent are hereby corrected as shown below:

| | |
|---|---|
| Column 1, Line 52 (In the Specification Page 3, Line 11) | Insert --1-- after Interchanger |
| Column 1, Line 60 (In the Specification Page 3, Line 19) | Delete "now U. S. Patent No. 3,641,728" |
| Column 2, Line 58 | Delete "DATA LINE AT A)" |

Signed and sealed this 19th day of December 1972.

(SEAL)
Attest:

EDWARD M.FLETCHER,JR.
Attesting Officer

ROBERT GOTTSCHALK
Commissioner of Patents